United States Patent
Oh et al.

(10) Patent No.: US 10,682,009 B2
(45) Date of Patent: Jun. 16, 2020

(54) APPARATUS FOR EXTRACTING COFFEE AND METHOD FOR PREHEATING HEATER THEREOF

(71) Applicant: COWAY CO., LTD., Chungcheongnam-do (KR)

(72) Inventors: Dong-Min Oh, Seoul (KR); Tae-Yong Son, Seoul (KR)

(73) Assignee: Coway Co., Ltd (KR)

(*) Notice: Subject to any disclaimer, the term of this patent is extended or adjusted under 35 U.S.C. 154(b) by 361 days.

(21) Appl. No.: 15/510,497

(22) PCT Filed: Aug. 28, 2015

(86) PCT No.: PCT/KR2015/009096
§ 371 (c)(1),
(2) Date: Mar. 10, 2017

(87) PCT Pub. No.: WO2016/039544
PCT Pub. Date: Mar. 17, 2016

(65) Prior Publication Data
US 2017/0280928 A1    Oct. 5, 2017

(30) Foreign Application Priority Data

Sep. 12, 2014  (KR) .......................... 10-2014-121155

(51) Int. Cl.
*A47J 31/56* (2006.01)
*A47J 31/36* (2006.01)
*A47J 31/44* (2006.01)

(52) U.S. Cl.
CPC .............. *A47J 31/56* (2013.01); *A47J 31/36* (2013.01); *A47J 31/44* (2013.01)

(58) Field of Classification Search
CPC ........ A47J 31/56; A47J 31/545; A47J 31/002; A47J 31/46; A47J 31/52; A47J 31/007;
(Continued)

(56) References Cited

U.S. PATENT DOCUMENTS 5,549,035 A * 8/1996 Wing-Chung ........ A47J 31/545
219/505
6,078,032 A  6/2000 Miller et al.
(Continued)

FOREIGN PATENT DOCUMENTS

| CN | 104024761 | 9/2014 |
| CN | 104080379 | 10/2014 |

(Continued)

OTHER PUBLICATIONS

Chinese Office Action dated Oct. 31, 2018 issued in counterpart application No. 201580048891.0, 10 pages.
(Continued)

*Primary Examiner* — Tu B Hoang
*Assistant Examiner* — Vy T Nguyen
(74) *Attorney, Agent, or Firm* — The Farrell Law Firm, P.C.

(57) ABSTRACT

Disclosed is an apparatus for extracting coffee that includes an input part which receives a command for controlling an operation of the apparatus for extracting coffee; a heater which heats water supplied to a coffee flow path for extracting coffee; a temperature sensor which measures the temperature of the heater; an input voltage acquisition part which acquires an input voltage value applied to the apparatus for extracting coffee; and a control part which determines the possibility of coffee extraction by detecting the operation of the apparatus for extracting coffee, and if it is determined that there is a high possibility of coffee extraction, controls a preheating operation of the heater on the basis of the input voltage value acquired by the input voltage acquisition part and the temperature of the heater measured by the temperature sensor.

6 Claims, 4 Drawing Sheets

(58) Field of Classification Search
CPC ...... A47J 31/057; A47J 31/0576; A47J 31/06;
A47J 31/08; A47J 31/36; A47J 31/3604;
A47J 31/3647; A47J 31/40; A47J 31/401;
A47J 31/402; A47J 31/41; A47J 31/4457;
A47J 31/4482; A47J 31/4489; A47J
31/462; A47J 31/505; A47J 31/54; A47J
31/542; A23F 5/262; A47L 15/481; B01D
2311/246; B01D 61/12; B01D 61/22;
G01F 23/292; H05B 1/0269
USPC .......... 426/231, 433, 594; 99/283, 285, 280,
99/281, 282, 294, 299, 275, 284, 289 R,
99/289 T, 290, 297, 300, 304, 323.1;
222/54, 129.1, 129.4, 146.5; 219/428,
219/505; 392/318, 324, 494, 498;
700/286
See application file for complete search history.

(56) References Cited

U.S. PATENT DOCUMENTS

| | | | |
|---|---|---|---|
| 2013/0152797 A1* | 6/2013 | Mori | A47J 31/3604 99/280 |
| 2014/0322401 A1* | 10/2014 | Etter | A47J 31/56 426/231 |
| 2014/0352543 A1 | 12/2014 | Boni et al. | |
| 2015/0157168 A1* | 6/2015 | Burrows | A47J 31/0576 426/231 |
| 2015/0201796 A1* | 7/2015 | Kuempel | A47J 31/5255 426/231 |
| 2016/0045062 A1* | 2/2016 | Howitt | A47J 31/401 222/54 |

FOREIGN PATENT DOCUMENTS

| | | |
|---|---|---|
| GB | 2 409 197 | 6/2005 |
| KR | 1020000037570 | 7/2000 |
| KR | 1020090099050 | 9/2009 |
| KR | 1020130079079 | 7/2013 |
| WO | WO 98/31266 | 7/1998 |
| WO | WO 00/07486 | 2/2000 |
| WO | WO 2008/041260 | 4/2008 |
| WO | WO 2013/084180 | 6/2013 |
| WO | WO 2013/100486 | 7/2013 |
| WO | WO 2014/114935 | 7/2014 |

OTHER PUBLICATIONS

European Search Report dated Apr. 24, 2018 issued in counterpart application No. 15840731.2-1006, 8 pages.

* cited by examiner

APPARATUS FOR EXTRACTING COFFEE AND METHOD FOR PREHEATING HEATER THEREOF

PRIORITY

This application is a National Phase Entry of PCT International Application No. PCT/KR2015/009096, which was filed on Aug. 28, 2015, and claims priority to Korean Patent Application No. 10-2014-0121155, which was filed on Sep. 12, 2014, the contents of each of which are incorporated herein by reference.

TECHNICAL FIELD

The present disclosure relates to an apparatus for extracting coffee and a method for preheating a heater thereof.

BACKGROUND ART

In a case in which apparatuses for extracting coffee continuously keep the temperature of a heater relatively high after power is applied thereto, coffee may be immediately extracted. However, a problem in which a great deal of energy is consumed to maintain the heater at a high temperature may occur. However, in a case in which the heater is not preheated, the preheating time is required to extract coffee. Thus, a problem may occur in which the waiting time for extracting coffee is increased, thus causing inconveniences to users.

In addition, in a case in which die casting heaters are used in apparatuses for extracting coffee, the response time of the die casting heaters is long. Thus, a proper method of controlling a heater is required.

With regard thereto, Patent Document 1, described in the following related art document, discloses apparatuses, such as a coffee machine, or the like, and a method related thereto.

Patent Document 1: Korean Patent Application No. 2009-0099050 (Date of publication: Sep. 21, 2009)

DISCLOSURE

Technical Problem

An aspect of the present disclosure may provide a method for preheating a heater at a time when the possibility of extracting coffee is relatively high, in consideration of characteristics of a die casting heater.

Technical Solution

According to an aspect of the present disclosure, an apparatus for extracting coffee is provided. The apparatus for extracting coffee includes an input unit receiving a command for controlling an operation of the apparatus for extracting coffee; a heater heating water supplied to a coffee flow path, in order to extract coffee; a temperature sensor measuring a temperature of the heater; an input voltage acquisition unit obtaining an input voltage value applied to the apparatus for extracting coffee; and a control unit determining the possibility of extracting coffee by detecting an operation of the apparatus for extracting coffee and controlling a preheating operation of the heater, based on the input voltage value obtained by the input voltage acquisition unit and the temperature of the heater, measured by the temperature sensor, in a case in which the possibility of extracting coffee is determined to be relatively high.

According to another aspect of the present disclosure, a method for preheating a heater of an apparatus for extracting coffee is provided. The method for preheating a heater of an apparatus for extracting coffee includes determining whether the possibility of extracting coffee is relatively high by detecting an operation of the apparatus for extracting coffee; obtaining an input voltage value of the apparatus for extracting coffee, in a case in which the possibility of extracting coffee is determined to be relatively high; setting a standard temperature for controlling a preheating operation of the heater, based on the input voltage value and an initial temperature of the heater; and controlling the preheating operation of the heater, according to a temperature of the heater based on the standard temperature and a flow rate of water supplied to a coffee flow path.

The technical solution described above does not illustrate an entirety of characteristics of the present disclosure. Various characteristics of the present disclosure and advantages and effects thereof may be understood in more detail with reference to the following specific exemplary embodiments.

Advantageous Effects

According to an aspect of the present disclosure, a heater may be preheated at a time when the possibility of extracting coffee is expected to be relatively high, thus reducing a waiting time for extracting coffee and reducing energy consumed for preheating the heater.

In addition, the heater may be properly controlled in consideration of characteristics of a die casting heater having a relatively long response time.

BEST MODE FOR INVENTION

Figure 1:
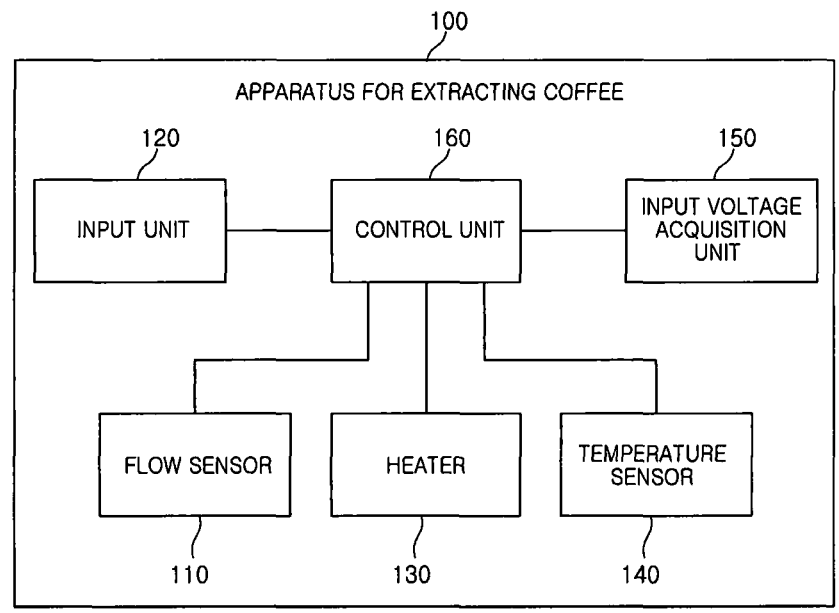
FIG. 1 is a block diagram of an apparatus for extracting coffee according to an exemplary embodiment in the present disclosure.

Hereinafter, exemplary embodiments in the present disclosure will be described with reference to schematic views illustrating exemplary embodiments in the present disclosure. In the drawings, for example, due to manufacturing techniques and/or tolerances, modifications of the shape shown may be estimated. Thus, exemplary embodiments in the present disclosure should not be construed as being limited to the particular shapes of regions shown herein, for example, to include a change in shape results in manufacturing. The following exemplary embodiments may also be constituted by one or a combination thereof.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. It will be further understood that the terms "comprises," and/or "comprising," when used in this specification, specify the presence of stated features, integers, steps, operations, members, elements, and/or groups thereof, but do not preclude the presence or addition of one or more other features, integers, steps, operations, members, elements, and/or groups thereof.

FIG. 1 is a block diagram of an apparatus for extracting coffee according to an exemplary embodiment in the present disclosure.

With reference to FIG. 1, an apparatus for extracting coffee 100, according to an exemplary embodiment, may include a flow sensor 110, an input unit 120, a heater 130, a temperature sensor 140, an input voltage acquisition unit 150, and a control unit 160.

The flow sensor 110 is provided for measuring the amount of water supplied to a coffee flow path formed in the apparatus for extracting coffee 100.

The input unit 120 is provided for receiving a command for controlling an operation of the apparatus for extracting coffee 100 from a user. In detail, the input unit 120 may include a coffee type selection button, a coffee extraction button, a preheating button, and the like.

The heater 130 is provided for heating water supplied to the coffee flow path in order to extract coffee, and may be implemented as a die casting heater, or the like.

The temperature sensor 140 is provided for measuring a temperature of the heater 130.

In detail, in a case in which the possibility of extracting coffee is determined to be relatively high by the control unit 160, to be subsequently described, and a heater preheating operation is required, an initial temperature of the heater 130 may be measured, and the temperature of the heater 130 may be continuously measured when the heater preheating operation is performed.

The input voltage acquisition unit 150 is provided for obtaining an input voltage value of the apparatus for extracting coffee 100.

In detail, the input voltage acquisition unit 150 may be implemented as a circuit for measuring an input voltage value, and may directly measure an input voltage value. Alternatively, the input voltage acquisition unit 150 may be implemented as a combination of a circuit for measuring a current value and a processor, and may measure a current value of a load (e.g., the heater 130, or the like) included in the apparatus for extracting coffee 100, in order to estimate the input voltage value from a measured current value.

The control unit 160 may determine whether the possibility of extracting coffee is relatively high by detecting an operation of the apparatus for extracting coffee 100. In a case in which the possibility of extracting coffee is determined to be relatively high, the control unit 160 is provided for controlling a heating operation of the heater 130, based on the input voltage value obtained by the input voltage acquisition unit 150 and the temperature of the heater 130, measured by the temperature sensor 140, and may be implemented as a microprocessor, or the like.

In detail, the control unit 160 may determine that the possibility of extracting coffee is relatively high, in a case in which the following operations of the apparatus for extracting coffee 100 are detected.

A case in which an operation of flushing a coffee flow path is finished after initial power is applied to the apparatus for extracting coffee 100.

A case in which a lever of the apparatus for extracting coffee 100 is operated.

A case in which a type of coffee is selected, by using the input unit 120 of the apparatus for extracting coffee 100.

A case in which coffee extraction by the apparatus for extracting coffee 100 is finished.

In addition, in a case in which the possibility of extracting coffee is determined to be relatively high, the control unit 160 may set a standard temperature for controlling the preheating operation of the heater 130, based on the input voltage value obtained by the input voltage acquisition unit 150 and the initial temperature of the heater 130, measured by the temperature sensor 140. A detailed method of setting the standard temperature will be subsequently described with reference to FIGS. 3 and 4.

Furthermore, the control unit 160 may control the preheating operation of the heater 130, according to the temperature of the heater 130, measured by the temperature sensor 140, based on a set standard temperature, and a flow rate measured by the flow sensor 110. A detailed method of controlling the preheating operation of the heater 130 will be subsequently described with reference to FIGS. 3 and 5.

Figure 2:
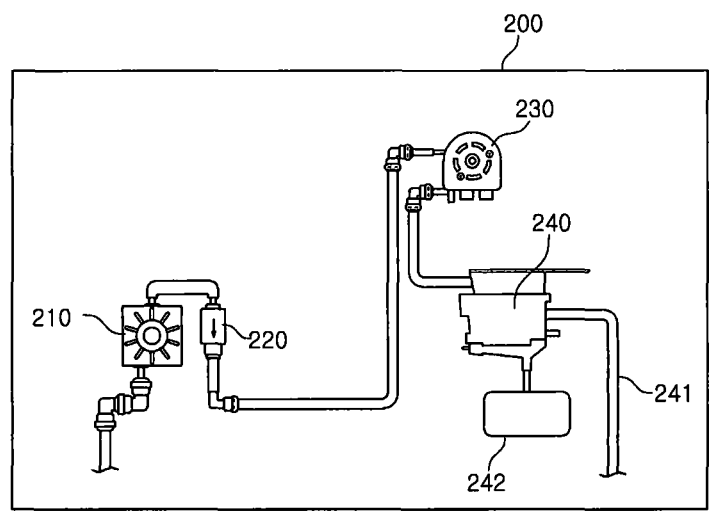
FIG. 2 is a diagram of a flow path of an apparatus for extracting coffee according to an exemplary embodiment.

FIG. 2 is a diagram of a flow path of an apparatus for extracting coffee according to an exemplary embodiment.

With reference to FIG. 2, a coffee flow path 200 of the apparatus for extracting coffee, according to an exemplary embodiment, may be formed in such a manner that a flow sensor 210, a high pressure pump 220, a die casting heater 230, and a capsule extraction unit 240 are connected in sequence. The capsule extraction unit 240 may include an extraction port 241 for extracting coffee and a discharge port 242 for discharging a foreign substance.

In this case, the high pressure pump 220 is provided for supplying high pressure water for extracting a coffee capsule. The capsule extraction unit 240 is provided for extracting the coffee capsule using high pressure and high temperature water heated by the die casting heater 230. Since functions of the flow sensor 210 and the die casting heater 230 are the same as those described with reference to FIG. 1, detailed descriptions thereof will be omitted.

INDUSTRIAL APPLICABILITY

Figure 3:
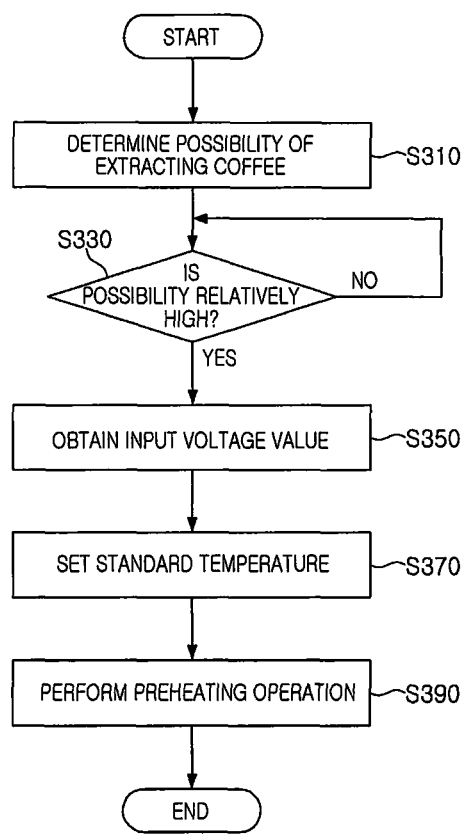
FIG. 3 is a flow chart of a method for preheating a heater of an apparatus for extracting coffee according to an exemplary embodiment.

FIG. 3 is a flow chart of a method for preheating a heater of an apparatus for extracting coffee according to an exemplary embodiment.

With reference to FIG. 3, a determination of whether the possibility of extracting coffee is relatively high is made by detecting an operation of the apparatus for extracting coffee, as described with reference to FIG. 1, in S310.

In a case in which the possibility of extracting coffee is determined to be relatively high in S330, an input voltage value of the apparatus for extracting coffee may be obtained in S350. In this case, the input voltage value may be directly measured by a circuit for measuring the input voltage value. Alternatively, the input voltage value may be estimated after a current value of a load included in the apparatus for extracting coffee is measured by the circuit for measuring the current value.

Figure 4:
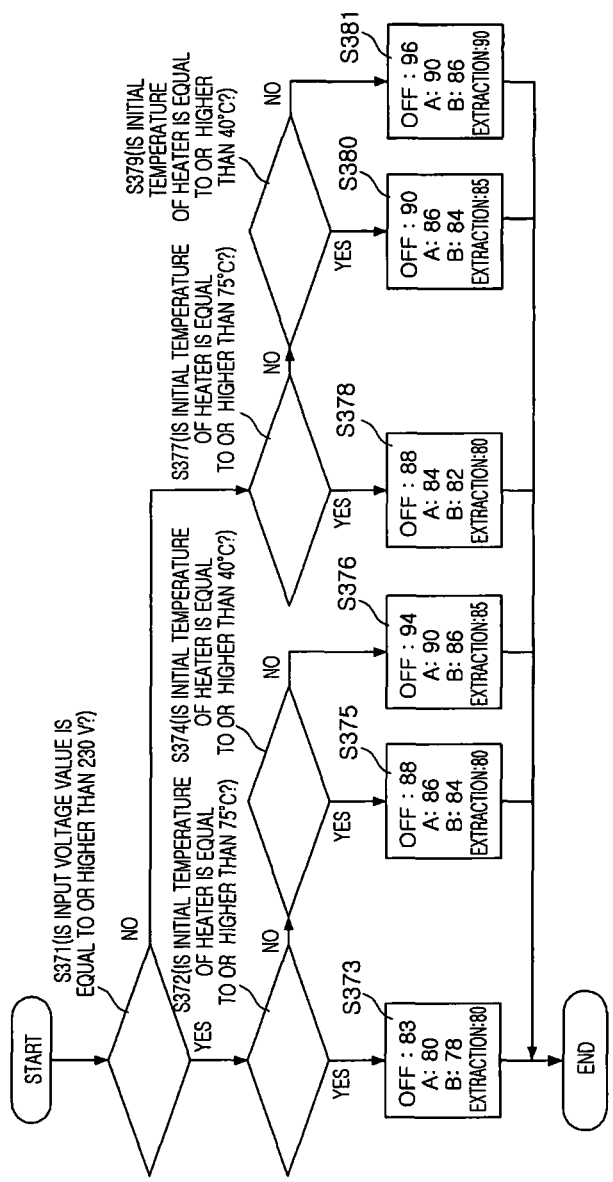
FIG. 4 is a detailed flow chart of the operation of setting a standard temperature illustrated in FIG. 3.

Subsequently, a standard temperature for controlling a heating operation of the heater may be set, based on an obtained input voltage value and an initial temperature of the heater in S370. In detail, as illustrated in FIG. 4, a determination is made as to whether the input voltage value is equal to or higher than 230 V, in S371. In each case, a determination may be made as to whether the initial temperature of the heater is equal to or higher than 75° C., or between 40° C. and 75° C., or below 40° C., in S372, S374, S377, and S379. Subsequently, the standard temperature may be set, as illustrated in Table 1, according to the determination results, in S373, S375, S376, S378, S380, and S381.

TABLE 1

| | Type | | | | | |
|---|---|---|---|---|---|---|
| | 1 (S373) | 2 (S375) | 3 (S376) | 4 (S378) | 5 (S380) | 6 (S381) |
| Input Voltage | 230 V or above | 230 V or above | 230 V or above | Below 230 V | Below 230 V | Below 230 V |
| Initial Temperature of Heater | 75° C. or above | 40° C. to below 75° C. | Below 40° C. | 75° C. or above | 40° C. to below 75° C. | Below 40° C. |
| Set Value of Standard Temperature | OFF: 83 A: 80 B: 78 Extraction: 80 | OFF: 88 A: 86 B: 84 Extraction: 80 | OFF: 94 A: 90 B: 86 Extraction: 85 | OFF: 88 A: 84 B: 82 Extraction: 80 | OFF: 90 A: 86 B: 84 Extraction: 85 | OFF: 96 A: 90 B: 86 Extraction: 90 |

In a set value of the standard temperature illustrated in Table 1, OFF refers to the standard temperature for controlling the heater to be in an OFF state, and extraction refers to a temperature for starting coffee extraction. In addition, a range of the input voltage and the initial temperature of the heater and the set value of the standard temperature corresponding thereto, illustrated in FIG. 4, may be merely examples, and design thereof may be changed according to need.

Figure 5:
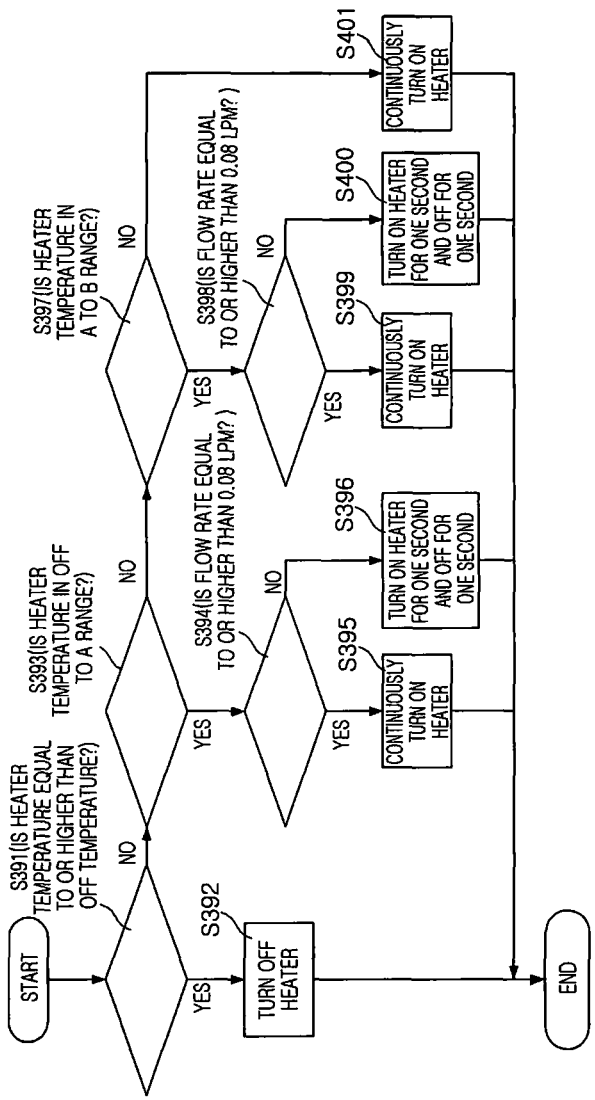
FIG. 5 is a detailed flow chart of the operation of performing a preheating operation as illustrated in FIG. 3.

Subsequently, the heating operation of the heater may be controlled, according to a temperature of the heater based on a set standard temperature and a flow rate of water supplied to a coffee flow path, in S390. In detail, as illustrated in FIG. 5, a determination is made as to whether the temperature of the heater is an OFF temperature or above, is within an OFF-A temperature range, an A-B temperature range, or is a temperature below a B temperature, among the set values of the standard temperature, in S391, S393, and S397. As a result of the determination, in a case in which the temperature of the heater is equal to or higher than the OFF temperature, preheating may not be required, so that the heater may be controlled to be in an OFF state, in S392. On the other hand, in a case in which the temperature of the heater is below the B temperature, preheating may be required, so that the heater may be controlled to be in a continuous ON state, in S392. In the meantime, in a case in which the temperature of the heater is within the OFF-A temperature range or the A-B temperature range, a further determination is made as to whether the flow rate of the water supplied to the coffee flow path is equal to or higher than 0.08 LPM, in S394 and S398. In a case in which the flow rate is equal to or higher than 0.08 LPM, the heater may be controlled to be in a continuous ON state, in S395 and S399. In a case in which the flow rate is below 0.08 LPM, the heater may be controlled to be turned on for one second and off for one second, in S396 and S400.

The method for preheating a heater of an apparatus for extracting coffee described above may be performed by the control unit 160 of the apparatus for extracting coffee 100, illustrated in FIG. 1.

While exemplary embodiments have been shown and described above, it will be apparent to those skilled in the art that modifications and variations could be made without departing from the scope of the present invention, as defined by the appended claims.

The invention claimed is:

1. An apparatus for extracting coffee, comprising:
    an input button receiving a command for controlling an operation of the apparatus for extracting coffee;
    a heater heating water supplied to a coffee flow path, in order to extract coffee;
    a temperature sensor measuring a temperature of the heater;
    an input voltage acquisition circuit obtaining an input voltage value applied to the apparatus for extracting coffee;
    a flow sensor measuring an amount of water supplied to the coffee flow path; and
    a controller determining a possibility of extracting coffee by detecting an operation of the apparatus for extracting coffee and controlling a preheating operation of the heater, based on the input voltage value obtained by the input voltage acquisition circuit and an initial temperature of the heater, measured by the temperature sensor, in a case in which the possibility of extracting coffee is determined to be relatively high,
    wherein, in a case in which the possibility of extracting coffee is determined to be relatively high, the controller sets standard temperatures for controlling the preheating operation of the heater, based on the initial temperature, and controls an On/Off state of the heater by comparing the temperature of the heater, measured by the temperature sensor, with the standard temperatures, and by measuring the amount of water supplied to the coffee flow path
    wherein the controller determines that the possibility of extracting coffee is relatively high, when an operation is detected among:
        a case in which an operation of flushing the coffee flow path is finished after initial power is applied to the apparatus for extracting coffee;
        a case in which a coffee extraction button of the apparatus for extracting coffee is operated;
        a case in which a type of coffee is selected by using a coffee type selection button; and
        a case in which coffee extraction is finished by the apparatus for extracting coffee.

2. The apparatus for extracting coffee of claim 1, wherein, in the case in which the possibility of extracting coffee is determined to be relatively high, the controller sets the standard temperatures, based on the input voltage value obtained by the input voltage-acquisition circuit and the initial temperature of the heater measured by the temperature sensor.

3. The apparatus for extracting coffee of claim 1, wherein controller sets the standard temperature for controlling the preheating operation of the heater, according to whether the input voltage value is equal to or higher than a predetermined standard voltage, and according to a temperature range in which the initial temperature of the heater is determined to be, among a plurality of predetermined temperature ranges.

4. The apparatus for extracting coffee of claim 3, wherein the controller controls the On/Off state of the heater, according to a temperature range in which the temperature of the heater is determined to be, among temperature ranges set, based on predetermined standard temperatures, and according to whether the flow rate is equal to or higher than a predetermined standard flow rate.

5. The apparatus for extracting coffee of claim 1, wherein the input voltage acquisition circuit is implemented as a circuit for measuring the input voltage value and directly measures the input voltage value.

6. The apparatus for extracting coffee of claim 1, wherein the input voltage acquisition circuit is implemented as a combination of the circuit for measuring a current value and a processor, measures the current value of the heater, and estimates the input voltage value from a measured current value.

\* \* \* \* \*